United States Patent
Singh et al.

(10) Patent No.: US 10,440,641 B2
(45) Date of Patent: Oct. 8, 2019

(54) IDLE-MODE CELLULAR-TO-WI-FI LINK SELECTION USING CIRCUIT-SWITCHED AUDIO QUALITY

(71) Applicant: Apple Inc., Cupertino, CA (US)

(72) Inventors: Ajoy K. Singh, Milpitas, CA (US); Vijay Venkataraman, Sunnyvale, CA (US); Sree Ram Kodali, Sunnyvale, CA (US); Mohan Krishna Gowda, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/606,729

(22) Filed: May 26, 2017

(65) Prior Publication Data

US 2018/0343593 A1 Nov. 29, 2018

(51) Int. Cl.
*H04W 36/30* (2009.01)
*H04W 36/00* (2009.01)
*H04W 36/14* (2009.01)
*H04W 48/18* (2009.01)

(52) U.S. Cl.
CPC ........ *H04W 48/18* (2013.01); *H04W 36/0083* (2013.01)

(58) Field of Classification Search
CPC ......... H04W 36/0066; H04W 36/0083; H04W 36/14; H04W 36/30; H04W 88/06; H04W 92/02; H04W 48/18; G06F 17/11
See application file for complete search history.

(56) References Cited

U.S. PATENT DOCUMENTS

| | | | |
|---|---|---|---|
| 9,497,771 B2 | 11/2016 | Vangala et al. | |
| 2013/0040666 A1 | 2/2013 | Chin et al. | |
| 2014/0067405 A1* | 3/2014 | Patel | G10L 19/22 704/500 |
| 2015/0036672 A1* | 2/2015 | Kim | H04W 48/18 370/338 |
| 2015/0334724 A1* | 11/2015 | Faccin | H04W 76/36 370/235 |
| 2015/0381291 A1* | 12/2015 | Mahajan | H04B 15/00 370/252 |
| 2016/0066217 A1 | 3/2016 | Krishnamoorthy et al. | |
| 2016/0127957 A1 | 5/2016 | Nylander et al. | |
| 2016/0234749 A1* | 8/2016 | Singh | H04W 36/0022 |
| 2017/0048773 A1 | 2/2017 | Miao et al. | |

(Continued)

*Primary Examiner* — Khawar Iqbal
(74) *Attorney, Agent, or Firm* — Meyertons Hood Kivlin Kowert and Goetzel PC; Jeffrey C. Hood

(57) ABSTRACT

A wireless communication device (UE) may perform wireless communications according to at least a first radio access technology (RAT) and a second RAT. When the UE is in idle-mode, it may determine whether to bias a RAT selection policy—which may be presently favoring networks operating according to the first RAT—towards the second RAT, based on one or more of the following: first information indicative of a quality of previous wireless communications performed by the UE according to the first RAT, second information indicative of an overall quality of wireless communications performed according to the first RAT by the UE over a specified period of time at a specific location where the UE is presently located, and/or third information indicative of an overall quality of wireless communications performed according to the first RAT by other UEs presently located at the specific location.

20 Claims, 9 Drawing Sheets

(56) References Cited

U.S. PATENT DOCUMENTS

| | | | | |
|---|---|---|---|---|
| 2017/0289898 A1* | 10/2017 | Youn | ..................... | H04W 48/14 |
| 2017/0339619 A1* | 11/2017 | Meylan | ................. | H04W 76/27 |
| 2017/0353907 A1* | 12/2017 | Beattie, Jr. | ............ | H04W 24/02 |
| 2018/0035469 A1* | 2/2018 | Chen | ..................... | H04W 72/10 |
| 2018/0098276 A1* | 4/2018 | Livanos | ................ | H04W 4/025 |
| 2018/0146408 A1* | 5/2018 | Meylan | ................. | H04W 16/14 |
| 2018/0167865 A1* | 6/2018 | Salkintzis | ............. | H04W 76/38 |
| 2018/0192297 A1* | 7/2018 | Chadaga | ............... | H04W 16/20 |
| 2018/0310145 A1* | 10/2018 | Bitra | ...................... | H04W 4/90 |
| 2018/0352486 A1* | 12/2018 | Singh | ............... | H04W 36/0061 |
| 2019/0037409 A1* | 1/2019 | Wang | ................... | H04W 16/04 |
| 2019/0037467 A1* | 1/2019 | Kronestedt | ........... | H04W 36/30 |

* cited by examiner

IDLE-MODE CELLULAR-TO-WI-FI LINK SELECTION USING CIRCUIT-SWITCHED AUDIO QUALITY

FIELD OF THE INVENTION

The present application relates to wireless communications, and more particularly to improved performance of idle-mode cellular-to-Wi-Fi link selection using circuit-switched audio quality.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

The UEs, which may be mobile telephones or smart phones, portable gaming devices, laptops, wearable devices, PDAs, tablets, portable Internet devices, music players, data storage devices, or other handheld devices, etc. may have multiple radio interfaces that enable support of multiple radio access technologies (RATs) as defined by the various wireless communication standards (LTE, LTE-A, Wi-Fi, BLUETOOTH™, etc.). The radio interfaces may be used by various applications and the presence of the multiple radio interfaces may necessitate the UE to implement mobility solutions to seamlessly run applications simultaneously over multiple radio interfaces (e.g., over LTE/LTE-A and BLUETOOTH™) without impacting the end-to-end performance of the application. Furthermore, a UE oftentimes implements an algorithm/policy for switching between the various wireless interfaces for certain applications, e.g. for streaming data, or for conducting audio/voice calls. For example, VoLTE allows UEs to conduct audio calls over LTE in addition to also having the ability to conduct voice calls over a circuit switched (CS) network.

UEs can use cross layer metrics to evaluate Wi-Fi versus cellular links for telephony voice and data use-cases. For example, a UE can use various metrics to evaluate various wireless links. Such metrics can include information corresponding to Wi-Fi, cellular, application (e.g. RTP) transport, and/or motion to name a few. The UE may evaluate both idle (e.g. when the UE is in idle-mode) and active (e.g. when the UE is conducting wireless communications) links. Idle links can be evaluated to decide on which link the UE should support Internet Protocol Multimedia Subsystem (IMS) registration, while active links can be evaluated to trigger active handover. However, evaluation of the quality of idle Wi-Fi links versus idle cellular links is not very reliable, especially when the UE is situated at the edge of a given cellular coverage area, where it can keep toggling between respective interfaces corresponding to various different radio access technologies (RATs), e.g. between GSM, WCDMA, and LTE, due to marginal cellular coverage. In such a scenario, there is a possibility that the UE might camp on a cellular link because of carrier policy even though a better quality Wi-Fi link may be available for conducting wireless phone calls over Wi-Fi.

Other corresponding issues related to the prior art will become apparent to one skilled in the art after comparing such prior art with the disclosed embodiments as described herein.

SUMMARY OF THE INVENTION

Embodiments are presented herein of, inter alia, of methods for dynamically determining when to use Wi-Fi communications versus cellular communications by using metrics and algorithms that predict Wi-Fi and cellular transmission performance in various wireless communication systems. Embodiments are further presented herein for wireless communication systems containing wireless communication devices (UEs) and/or base stations and access points (APs) communicating with each other within the wireless communication systems.

In some embodiments, a UE may conduct first wireless communications according to a first radio access technology (RAT), for example cellular communications, and may also conduct second wireless communications according to a second RAT, for example Wi-Fi communications. The wireless communications may include audio calls, which are conducted according to the first RAT during any given time period and according to the second RAT during any other given time period. The wireless communication device may dynamically determine when it would be more advantageous to communicate according to the first RAT versus communicating according to the second RAT, based on device link, transport and/or Internet Protocol Multimedia Subsystem (IMS) voice-over IP (VoIP) metrics. The wireless communication device may support various communication policies (e.g. network policies), and may bias any such policy algorithms based on the dynamic determination.

Accordingly, in some embodiments, a device, for example a wireless communication device (UE) may wirelessly communicate according to any one of two different RATs (or two different types of RATs) during any given time period, and may determine whether to bias a RAT selection policy algorithm toward favoring one of the two different wireless RATs. The UE may base the determination on a set of criteria that includes, but is not limited to, first information indicative of an overall quality of wireless communications previously conducted by the UE according to a first RAT of the two different RATs, second information indicative of an overall quality of wireless communications conducted according to the first RAT by the UE over a specified period of time at a specific location where the UE is presently located, and/or third information indicative of an overall quality of wireless communications conducted according to the first RAT by other UEs presently located at the specific location. The UE may then determine, according to the RAT selection policy algorithm, which of the two different wireless RATs (or which of the two different types of RATs) to select during idle-mode for future wireless communications to be conducted after exiting idle-mode.

The UE may determine a combined biasing score using the first information, the second information and the third information, and determine whether to bias the RAT selection policy algorithm based on the combined biasing score. In some embodiments, the combined biasing score is obtained using respectively weighted values corresponding to the first information, the second information, and the third information. The UE may bias the RAT selection policy algorithm towards favoring the second RAT if the combined biasing score exceeds a specified threshold value. Furthermore, the overall quality of wireless communications may be determined according to any one or more of a codec type, number of total erasures, number of total playbacks, and/or various cellular metrics. The wireless communications for which the quality is determined may be audio calls, and the UE may be determining whether a network policy ought to be biased toward favoring Wi Fi more than the network policy presently does. In addition, the UE may generate the first information while conducting wireless communications according to the first RAT, and store the first information in a persistent historical database for later use in determining whether to bias the RAT selection policy algorithm.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
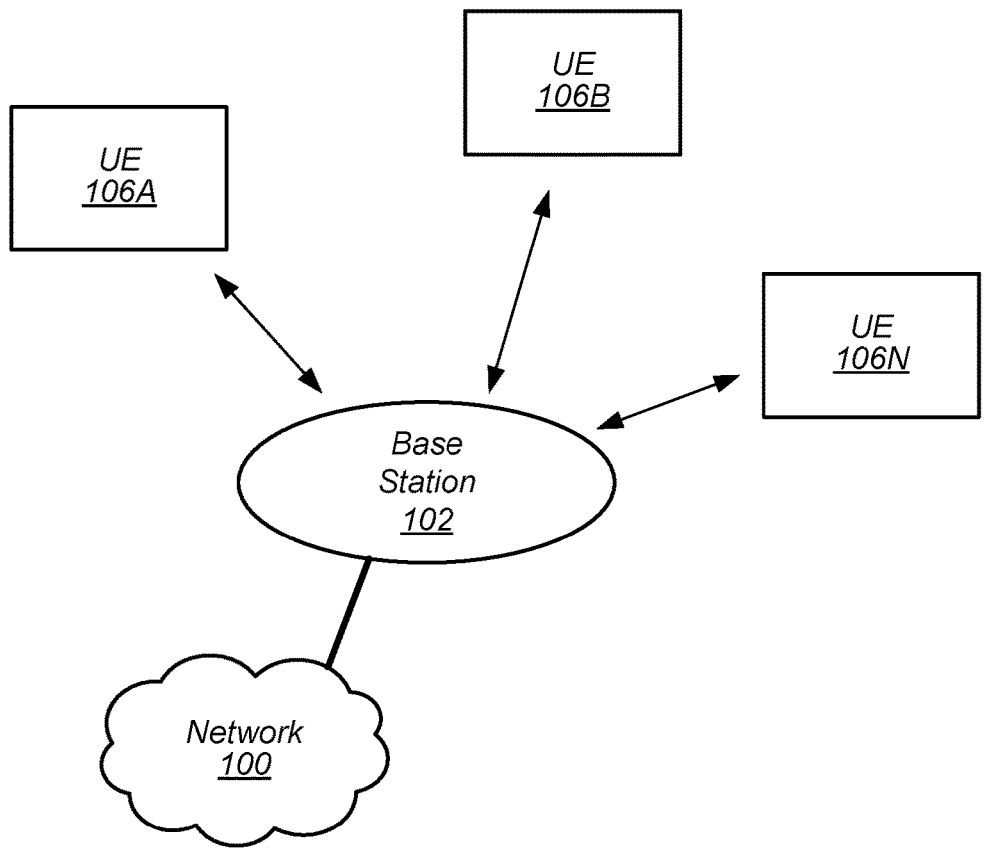
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
AP: Access Point
APN: Access Point Name
APR: Applications Processor
BS: Base Station
BSR: Buffer Size Report
BSSID: Basic Service Set Identifier
CCA: Clear Channel Assessment
CMR: Change Mode Request
CS: Circuit Switched
DL: Downlink (from BS to UE)
DYN: Dynamic
EDCF: Enhanced Distributed Coordination Function
FDD: Frequency Division Duplexing
FO: First-Order state
FT: Frame Type
GPRS: General Packet Radio Service
GSM: Global System for Mobile Communication
GTP: GPRS Tunneling Protocol
IMS: Internet Protocol Multimedia Subsystem
IP: Internet Protocol
IR: Initialization and Refresh state
LAN: Local Area Network
LBT: Listen Before Talk
LQM: Link Quality Metric
LTE: Long Term Evolution
NB: Narrowband
PDCP: Packet Data Convergence Protocol
PDN: Packet Data Network
PDU: Protocol Data Unit
PGW: PDN Gateway
PSD: Power Spectral Density
PSS: Primary Synchronization Signal
PT: Payload Type
QBSS: Quality of Service Enhanced Basic Service Set
QI: Quality Indicator
RAT: Radio Access Technology RF: Radio Frequency
ROHC: Robust Header Compression
RTP: Real-time Transport Protocol
RTT: Round Trip Time
RX: Reception/Receive
SID: System Identification Number
SGW: Serving Gateway
SSS: Secondary Synchronization Signal
TBS: Transport Block Size
TCP: Transmission Control Protocol
TDD: Time Division Duplexing
TX: Transmission/Transmit
UE: User Equipment
UL: Uplink (from UE to BS)
UMTS: Universal Mobile Telecommunication System
WB: Wideband
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony Play Station™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing one or more functions in a device, e.g. in a user equipment device or in a cellular network device, and/or cause the user equipment device or cellular network device to perform one or more functions. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
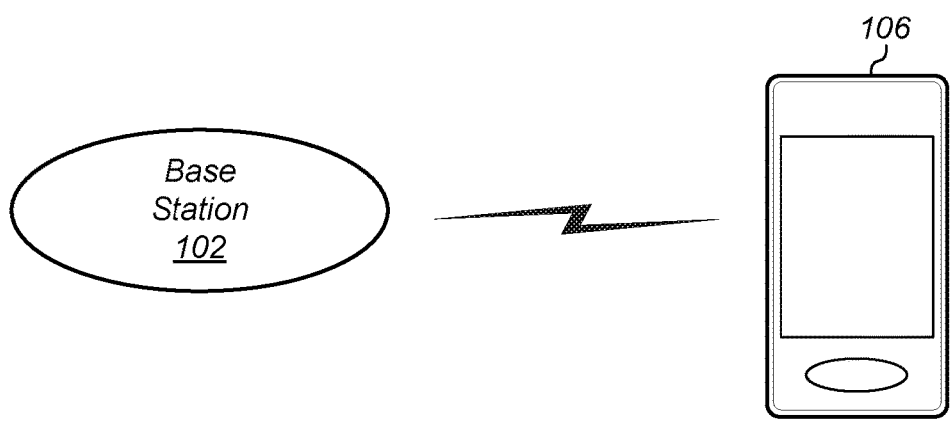
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE) or UE device. Thus, the user devices 106 are referred to as UEs or UE devices. Various ones of the UE devices may operate to dynamically bias network policy algorithms as further described herein.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 3GPP2 CDMA2000 (e.g., 1×RTT, 1×EV-DO, HRPD, eHRPD), Wi-Fi, WiMAX etc. In some embodiments, the base station 102 communicates with at least one UE using dynamic biasing of network selection policy algorithm(s) as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Overall, the use of various terms and expressions will always be clearly indicated with respect to and within the context of the various applications/embodiments under consideration.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and BLUETOOTH™. Other configurations are also possible.

Figure 3:
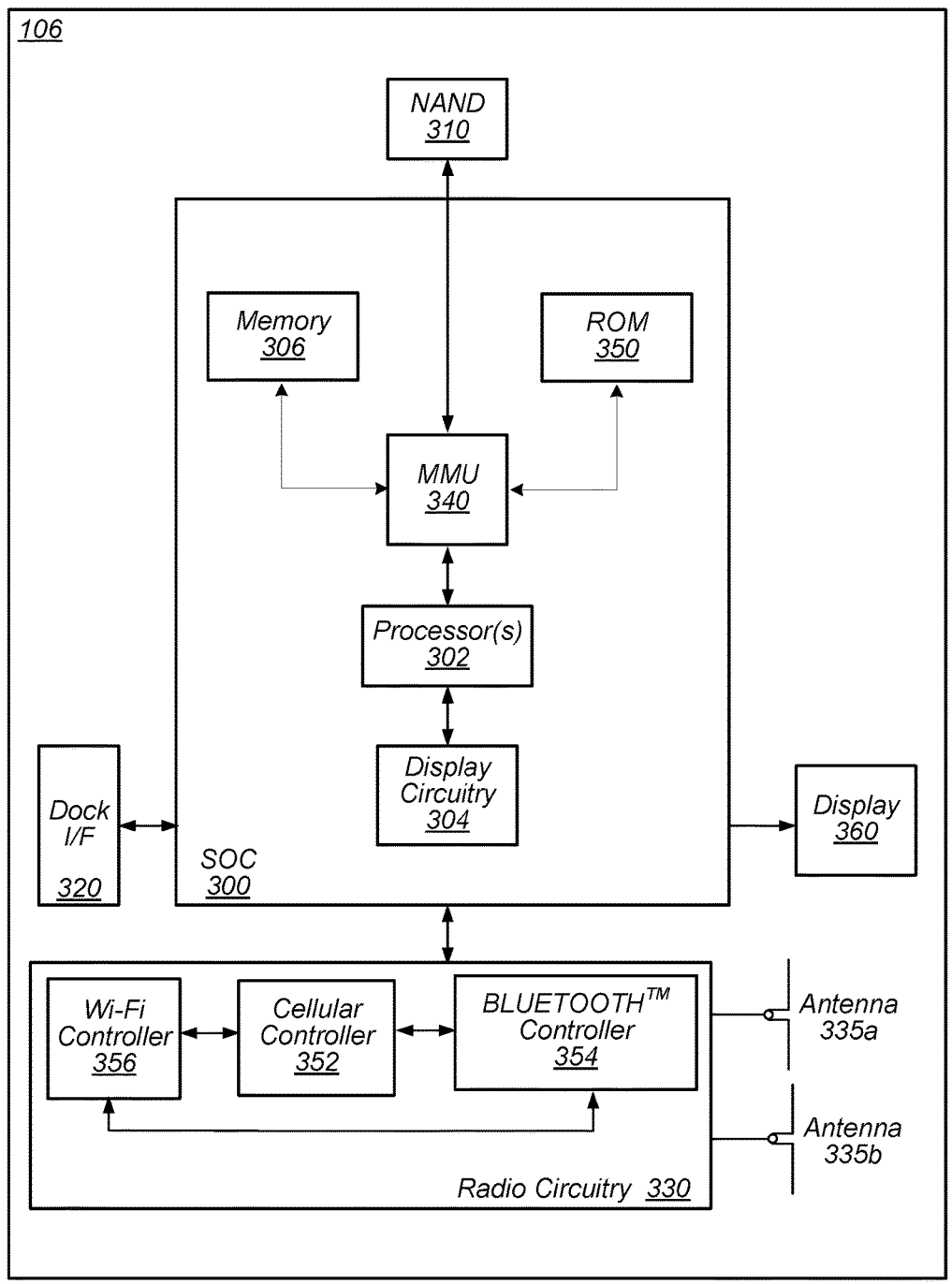
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to dynamically bias RAT selection policy algorithm(s) based on various information as further detailed herein. Thus, in some embodiments, UE 106 may use, among others, information corresponding to the overall quality of previous cellular calls conducted by UE 106, and audio quality information from other devices at the same location where UE 106 is presently located, to dynamically determine whether to bias RAT selection policy algorithm(s) for future communications. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporate dynamically biasing RAT selection policy algorithms according to various embodiments disclosed herein. Specifically, processor(s) 302 may be coupled to and/or may interoperate with other components as shown in FIG. 3 to facilitate UE 106 communicating in a manner that seeks to optimize RAT selection. Processor(s) 302 may also implement various other applications and/or end-user applications running on UE 106.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106.

Figure 4:
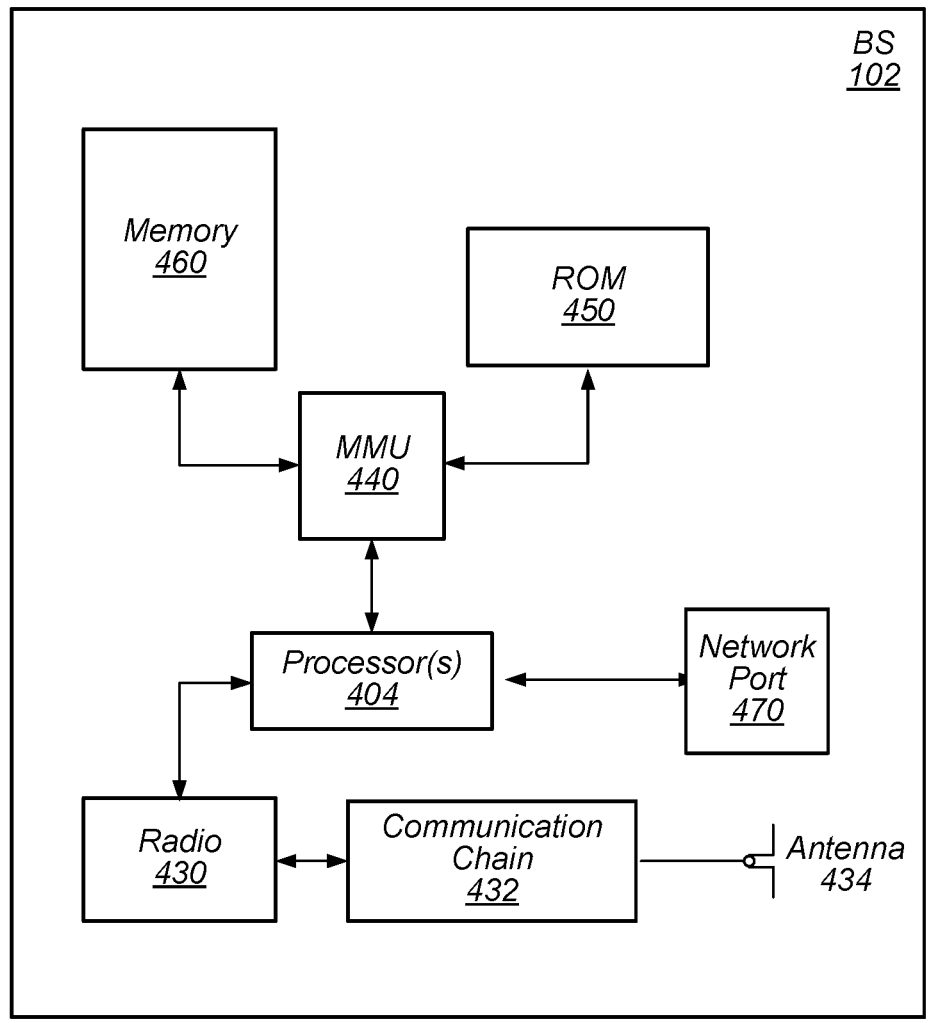
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device capable of dynamically biasing RAT selection policy algorithms. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices capable of dynamically biasing RAT selection policy algorithms according to various embodiments described herein.

Figure 5:
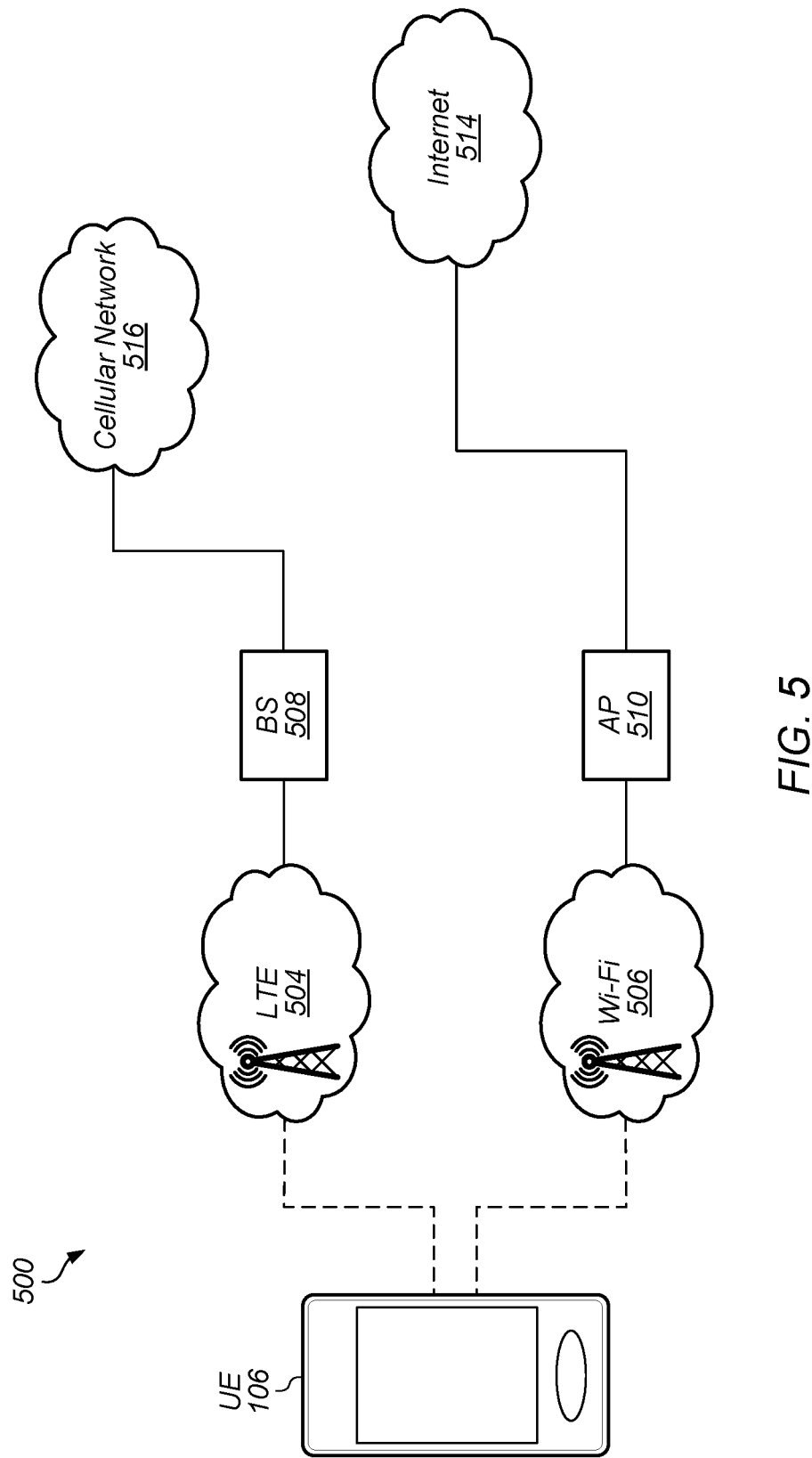
FIG. 5 illustrates an exemplary wireless communication system, according to some embodiments.

FIG. 5—Exemplary Communication System

FIG. 5 illustrates an exemplary wireless communication system 500 in accordance with some embodiments. System 500 is a system in which an LTE access network and a Wi-Fi radio access network are implemented. The system 500 may include UE 106 and LTE network 504 and Wi-Fi network 506.

LTE access network 504 is representative of some embodiments of a first RAT access and Wi-Fi access network 506 is representative of some embodiments of a second RAT access. LTE access network 504 may be interfaced with a broader cellular network (e.g. LTE network) and Wi-Fi access network 506 may be interfaced with the Internet 514. More particularly, LTE access network 504 may be interfaced with a serving base station (BS) 508, which may in turn provide access to broader cellular network 516. The Wi-Fi access network 506 may be interfaced with an access point (AP) 510, which may in turn provide access to the Internet 514. UE 106 may accordingly access Internet 514 via AP 510 and may access cellular network 516 via LTE access network 504. In some embodiments, not shown, UE 106 may also access Internet 514 via LTE access network 504. More specifically, LTE access network 504 may be interfaced with a serving gateway, which may in turn be interfaced with a packet data network (PDN) gateway. The PDN gateway may, in turn, be interfaced with Internet 514. UE 106 may accordingly access Internet 514 via either or both of LTE access network 504 and Wi-Fi access network 506. Accordingly, UE 106 may conduct various communications, e.g. data transfers or audio voice calls, via either or both of LTE access network 504 and Wi-Fi access network 506. Furthermore, while FIG. 5 shows an LTE access network, other cellular networks (not shown) may equally be accessed by UE 106 in a manner similar to accessing LTE access network 504. For example, UE 106 may use a GSM access network for conducting GSM communications, etc.

Figure 6:
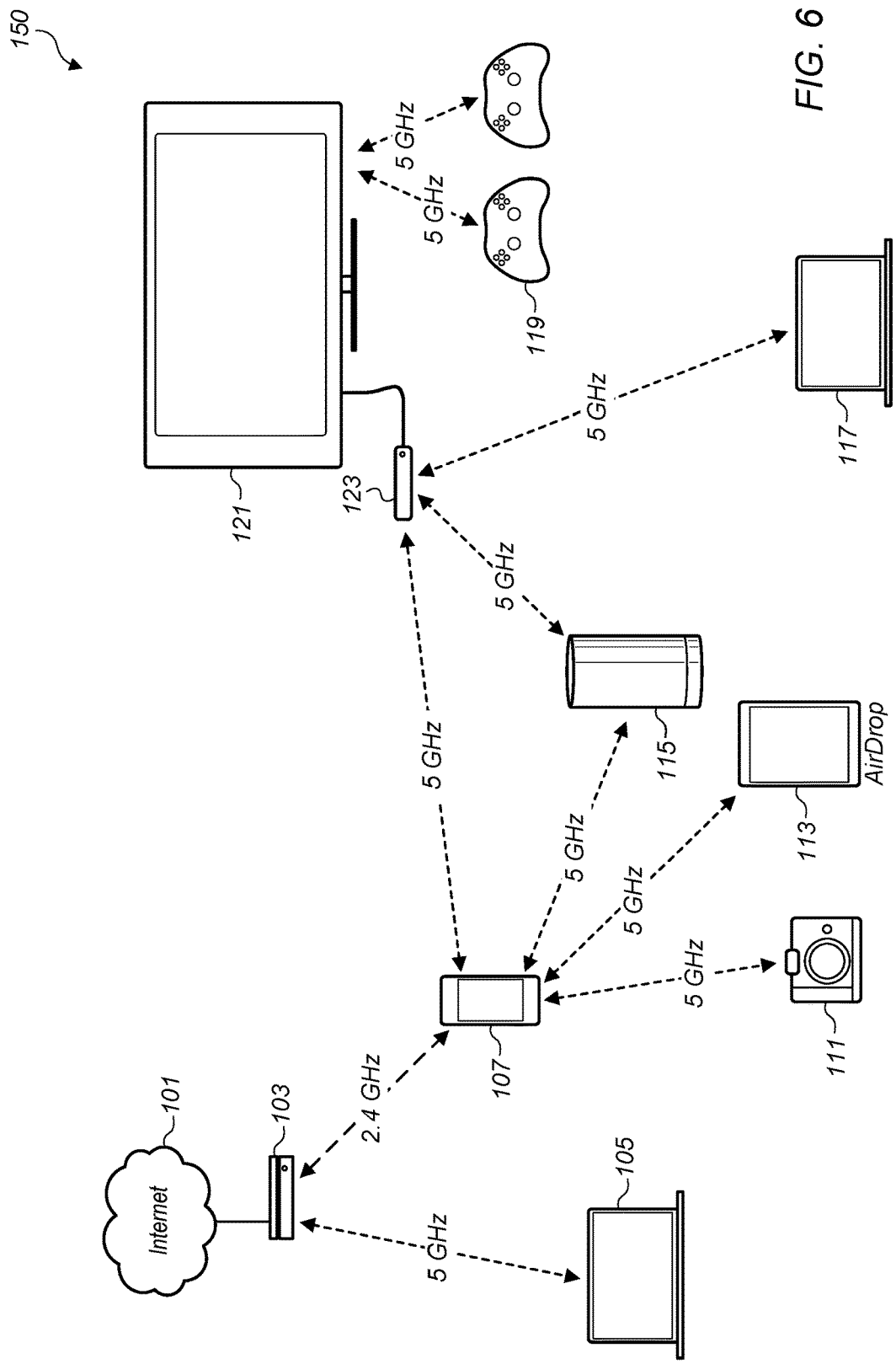
FIG. 6 shows an exemplary communication system in which multiple different devices may communicate with each other over a specific band, such as 2.4 GHz and/or 5 GHz frequency bands using Wi-Fi.

FIG. 6—Exemplary Communication System with Multiple Wi-Fi Devices

FIG. 6 shows an exemplary communication system in which multiple different devices may communicate with each other over a specific band, such as 2.4 GHz and/or 5 GHz frequency bands using a Wi-Fi RAT. 5 GHz Wi-Fi (IEEE 802.11 ac/n) capable devices have become quite common, operating in both peer-to-peer mode and/or station mode, as shown in FIG. 6. Data communications over a specific frequency band, e.g. over the 5 GHz band may include voice, video, real time and best effort type of traffic. Illustrated devices include cameras (111), tablets (113), media servers/mini-servers (115), portable computers (105, 117), access ports/routers (103), game controllers (119), mobile devices such as smart phones (107), and smart monitors (121) or monitors with wireless access interface (121 together with 123). As shown in FIG. 6, many of the devices may communicate over the 5 GHz band, using Wi-Fi communication technology, and may also communicate at least as shown in FIG. 5. Thus, in addition to communicating using Wi-Fi technology, any one or more of the devices may also communicate using any one or more cellular communication technologies as previously described.

Radio Access Technology Selection

Various embodiments disclosed herein may include wireless communication devices (UEs) dynamically determining when to use Wi-Fi communications versus cellular communications by using various metrics and algorithms to predict Wi-Fi and cellular user performance. In some embodiments, the UE may utilize device link, transport, and IMS VoIP metrics to determine whether to bias a network policy (or more generally, a RAT selection policy algorithm) towards favoring one specific RAT, for example Wi-Fi. The RAT selection policy algorithms may be associated with a variety of policies with built-in preferences, such as Wi-Fi-preferred, cellular preferred, and/or IMS preferred, just to name a few.

Figure 7:
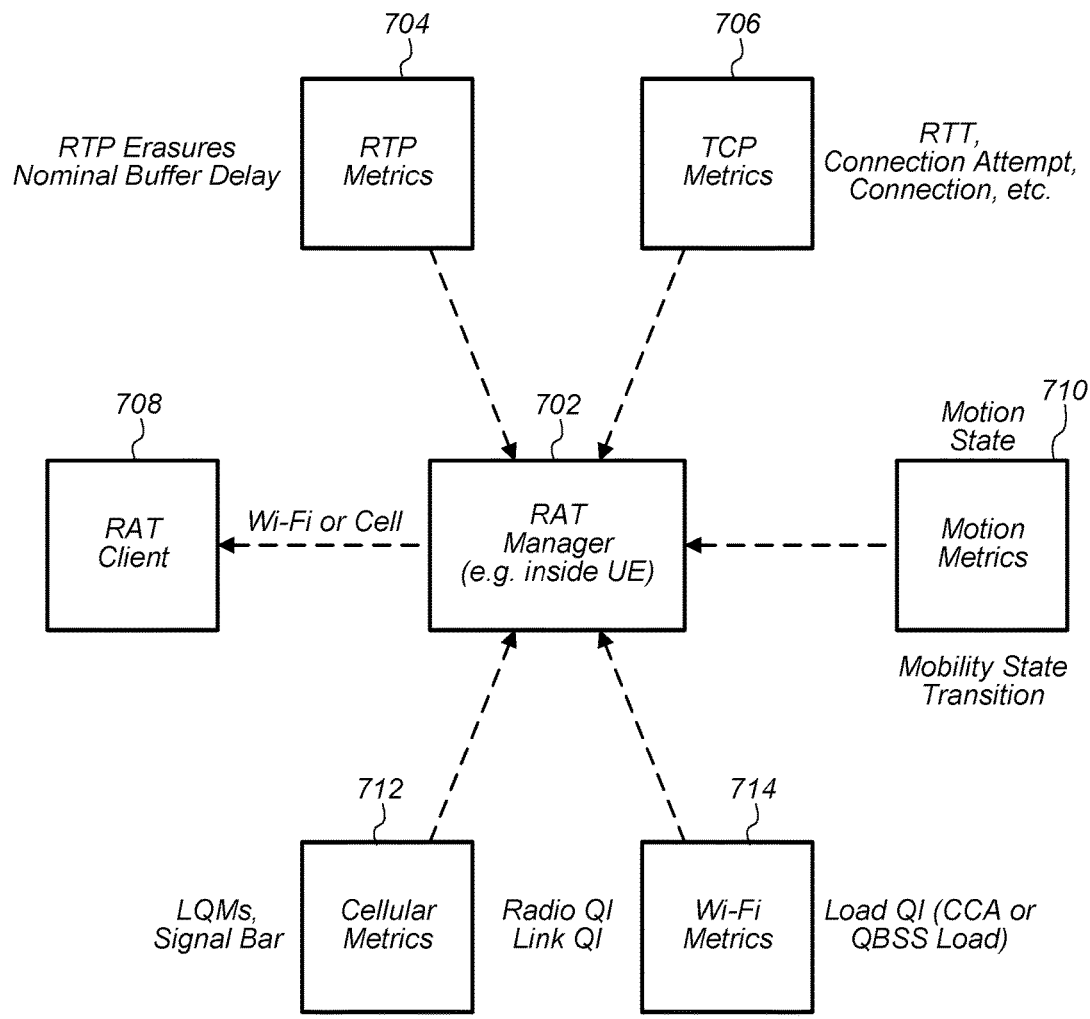
FIG. 7 shows a block diagram of an exemplary radio access technology selection manager, according to some embodiments.

As previously mentioned, present RAT managers (or RAT management algorithms) may use cross layer metrics to evaluate Wi-Fi versus cellular links for telephony voice and data use-cases. For example, a RAT manager in a UE may use the following metrics in link evaluation: Wi-Fi, cellular, application (e.g., RTP), transport, and/or motion. The RAT manager (or more generally, the UE) may evaluate both idle and active links. Idle links may be evaluated to determine on which link the UE may support IMS registration, while the active links may be evaluated to trigger an active handover. FIG. 7 provides an illustration of an exemplary RAT selection manager 702, according to some embodiments. As shown in FIG. 7, RAT manager 702 may determine whether RAT client 708 ought to conduct Wi-Fi communications or cellular communications. RAT manager 702 may use RTP metrics 704, TCP metrics 706, motion metrics 710, Wi-Fi metrics 714 and/or cellular metrics 712 to determine which of Wi-Fi and cellular technologies to instruct the RAT client to use. The RAT client 708 may represent a UE or an application executing on the UE, or any entity with the capability of communicating according to Wi-Fi and cellular technologies.

RAT Selection Example: Idle-Mode IMS Preferred with Device on Wi-Fi

Figure 8:
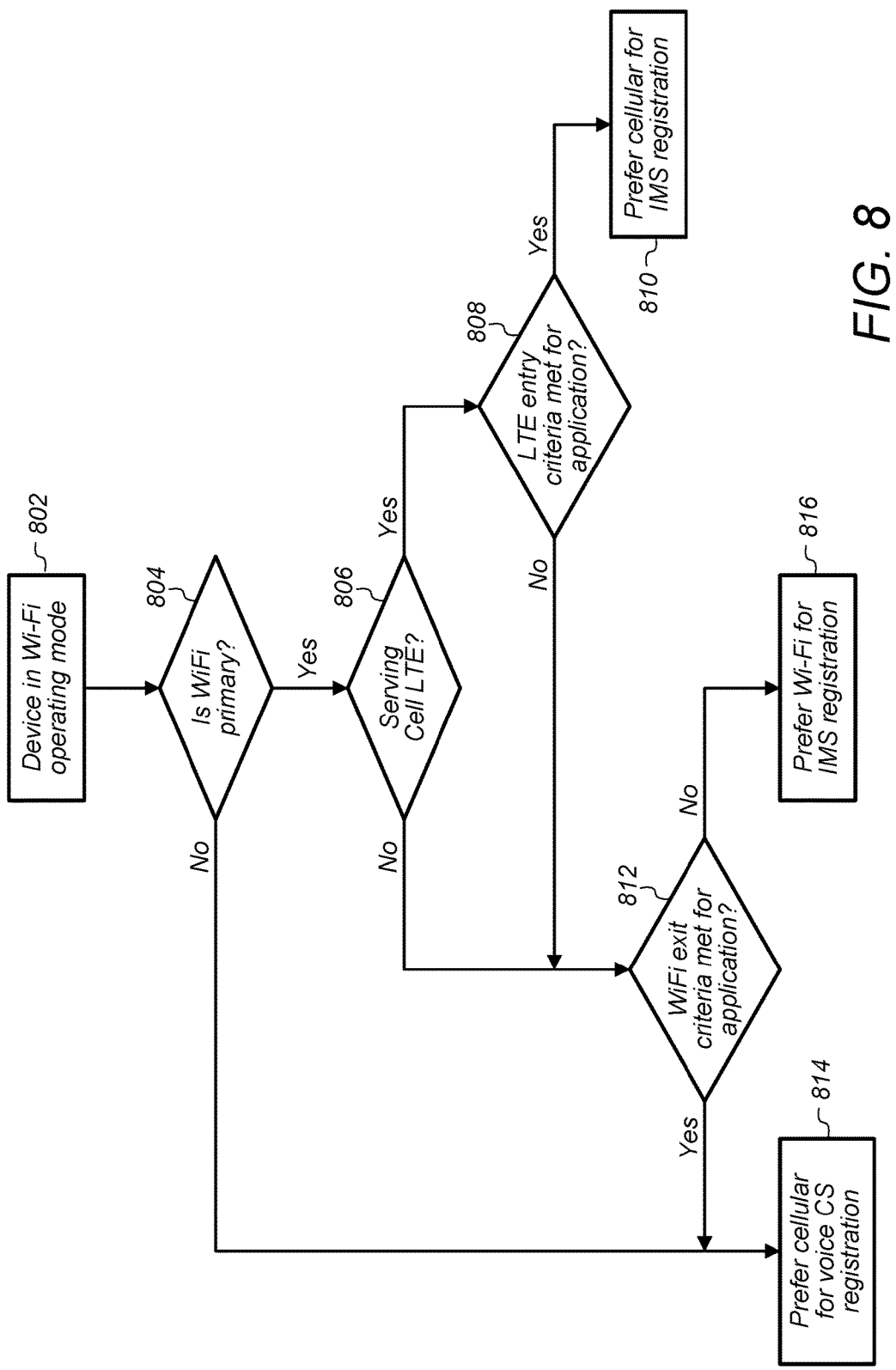
FIG. 8 shows an exemplary flowchart illustrating an idle-mode IMS-preferred radio access technology selection policy algorithm, for device on Wi-Fi, according to some embodiments.

FIG. 8 shows an exemplary flowchart illustrating an idle-mode IMS-preferred RAT selection policy algorithm, for a device on Wi-Fi, according to some embodiments. That is, the flowchart illustrates a RAT selection policy algorithm for a UE that is in idle-mode and was most recently conducting Wi-Fi communications. In summary, as indicated in FIG. 8, while the UE is on Wi-Fi, it may continue on Wi-Fi as long as the Wi-Fi link quality is determined to meet previously specified criteria, switch to cellular communications (LTE or 3G or similar) if the Wi-Fi link quality is determined not to meet previously specified criteria, or switch to LTE if the LTE link quality is determined to meet previously specified criteria.

With the device in a Wi-Fi operating mode (802), if Wi-Fi is not designated as the primary RAT ("No" taken at 804), the device may prefer a cellular network for voice CS registration (814). If Wi-Fi is designated as the primary RAT ("Yes" taken at 804), the current serving cell is LTE ("Yes" taken at 806), and the LTE entry criteria are met ("Yes" taken at 808), the device may prefer cellular for IMS registration (810). If the LTE entry criteria are not met ("No" taken at 808) and the Wi-Fi exit criteria are met ("Yes" taken at 812), the device may prefer a cellular network for voice CS registration (814). If the Wi-Fi exit criteria are not met ("No" taken at 812), the device may prefer Wi-Fi for IMS registration (816). The device may also proceed to determining whether the Wi-Fi exit criteria are met (812) if the present serving cell is not LTE ("No" taken at 806).

RAT Selection Example: Idle-Mode IMS Preferred with Device on Cellular

Figure 9:
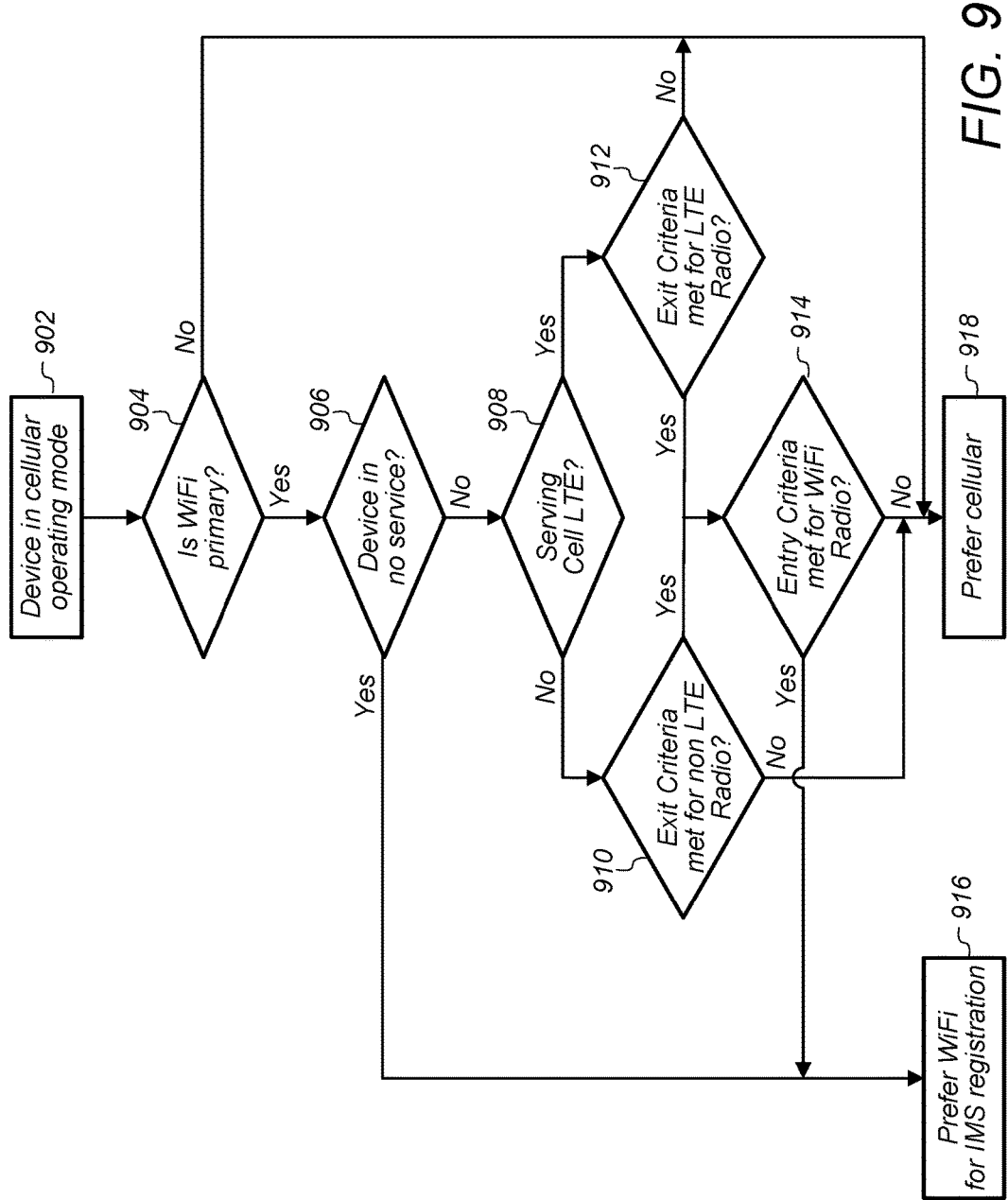
FIG. 9 shows an exemplary flowchart illustrating an idle-mode IMS-preferred radio access technology selection policy algorithm, for device on cellular, according to some embodiments.

FIG. 9 shows an exemplary flowchart illustrating an idle-mode IMS-preferred radio access technology selection policy algorithm, for a device on cellular, according to some embodiments. That is, the flowchart illustrates a RAT selection policy algorithm for a UE that is in idle-mode and was most recently conducting cellular communications. In summary, as indicated in FIG. 9, while the UE is on cellular (e.g. 3G/2G/LTE, or the like), it may evaluate cellular link quality, including LTE evaluation (voice LQM, signal bar, etc.) and/or 3G/2G evaluation (signal bar, data LQM). The device may conduct cellular wireless communications as long as cellular signal quality is determined to meet previously specified criteria, otherwise the device may switch to Wi-Fi communications if the Wi-Fi signal quality is determined to meet previously specified criteria.

With the device in a cellular operating mode (902), if Wi-Fi is not designated as the primary RAT ("No" taken at 904), the device may prefer a cellular network (918). If Wi-Fi is designated as the primary RAT ("Yes" taken at 904) and the device is in a no-service zone, e.g. no cellular service is available, then the device may prefer Wi-Fi for IMS registration (916). If the device is not in a no-service zone ("No" taken at 906), the device may determine if the present serving cell is an LTE cell (908). If it is ("Yes" taken at 908) and the exit criteria for LTE radio are not met ("No" taken at 912), then the device may prefer cellular communications (918). If the exit criteria for LTE radio are met ("Yes" taken at 912) and the entry criteria for Wi-Fi radio are met ("Yes" taken at 914) then the device may prefer Wi-Fi for IMS registration (916). If the entry criteria for Wi-Fi radio are not met ("No" taken at 914) then the device may prefer cellular communications (918). If it is determined that the present serving cell in not an LTE cell ("No" taken at 908), then if the exit criteria for non-LTE radio are not met ("No" taken at 910), then the device may prefer cellular communications (918), otherwise ("Yes" taken at 910) the entry criteria for Wi-Fi radio are determined (914). Again, if the entry criteria for Wi-Fi radio are met ("Yes" taken at 914) then the device may prefer Wi-Fi for IMS registration (916), otherwise ("No" taken at 914), the he device may prefer cellular communications (918).

Issues with Idle-Mode RAT Selection

The policies/algorithms exemplified in FIGS. 8 and 9 may not always result in selection of a best RAT under the given conditions because the evaluation of Wi-Fi link quality and the evaluation of cellular link quality when the device (e.g. UE) is in idle-mode may not be very reliable. This may be true especially when the device is located at the edge of a given cell, for example at the edge of a particular cellular coverage area, where the device may be toggling among various different RAT interfaces, e.g. among GSM, WCDMA, and/or LTE, due to marginal cellular coverage. In such a scenario, there is a possibility that the device will camp on cellular links because of carrier policy even though there may be a Wi-Fi link available for higher quality Wi-Fi calling with respect to cellular calls conducted on the cellular network on which the device is camped. In such cases, communications conducted by the device (e.g. by the UE) may be prone to poor audio and/or may result in dropped calls due a variety of reasons. For example, the device may conduct a CS call and may be unable to handover from CS to Wi-Fi when the quality of the CS link deteriorates during the active call. In another example, a handover may fail due to a race condition between VoLTE to CS handover and VoLTE to Wi-Fi handover.

Preferred Policies and Policy Biasing

FIG. 8 and FIG. 9 provide examples of RAT selection policy algorithms for IMS-preferred policies. Such policies, and hence the corresponding RAT selection policy algorithms may have an inherent preference for any given RAT and/or technology affecting decision making while traversing the flowchart. For example, referring to FIG. 8, the decision(s) made at block 808 may include analyzing/determining various metrics and or individual criteria, such as any one or more metrics shown in FIG. 7, to make an overall determination regarding which branch to take ("Yes" or "No"). For any given policy, the various metrics and criteria may have respective weights, importance, and/or requirements attributed to them, and any such weights and/or requirements may therefore have a bearing on the decision whether to select the "Yes" path or the "No" path. Thus, a preferred policy may be associated with a RAT selection policy algorithm in which the weights/requirements reflect a preference for a given RAT and/or technology. For example, in Wi-Fi preferred policy, metrics for Wi-Fi and cellular (e.g. 714 and 712, respectively, in FIG. 7) may be weighted/biased such that Wi-Fi selection is favored with respect to cellular. Similarly, cellular preferred policies may have those same metrics weighted/biased such that cellular selection is favored with respect to Wi-Fi. Similarly, any or all of the metrics (e.g. those shown in FIG. 7) directly incorporated in the decision making, e.g. at 808 in FIG. 8 and at 910 and/or at 912 in FIG. 9, may have a specific weight/importance attributed to them. Pursuant to the above, modifying the weight/requirements attributed to any one or more (or combination) of such metrics may effectively bias the RAT selection policy algorithm towards favoring any selected or specified RAT and/or technology, depending/based on the modified weights/requirements.

Using Historical Audio Metrics for RAT Selection Policy Biasing

In some embodiments, for idle-mode link selection, especially in cell edge scenarios where the device (e.g. UE) may keep toggling between various different RAT interfaces, e.g. between different cellular interfaces such LTE, WCDMA, and GSM, to name a few, additional metrics may be used to determine whether to bias various RAT selection policy algorithms. Thus, in addition to already used cellular metrics (signal bar, LQM, etc.), the device may also consider the quality of previously conducted cellular communications, e.g. previously conducted CS audio/voice calls in determining RAT selection.

If the audio quality of a CS call did not meet previously specified criteria, the device (e.g. a RAT selection manager executing on the device) may consider biasing a RAT selection policy (algorithm) toward favoring Wi-Fi over cellular if the device is at the same location, even if the RAT selection policy algorithm (e.g. carrier policy) is presently set to prefer cellular or IMS. The location of the device may be determined using a combination of Wi-Fi AP BSSID and cellular ID.

In addition to using quality information corresponding to previously conducted cellular communications, e.g. previously conducted audio calls, the device (or UE or RAT selection manager executing on the device) may also consider historical CS audio quality of wireless voice/audio communications conducted by the device at a given location. The historical CS audio quality may be based on the quality of CS audio calls conducted by the device over a specified period of time, e.g. over several weeks, at the given location (e.g., when the device is associated with a known BSSID). The device may use this historical CS audio quality information when determining whether to bias and/or how much to bias one or more RAT selection policy (e.g. network policy) algorithms to favor Wi-Fi over cellular communications.

In some embodiments, especially in case of hotspot scenarios, the device may also use CS audio quality information associated with voice/audio communications conducted by other devices located at the same location as the device. The audio quality information associated with the other devices may be shared using peer-to-peer or centralized servers (e.g., cloud services, etc.)

In some embodiments, the device may evaluate the CS audio quality using a number of metrics that include but are not limited to codec type (e.g., NB-AMR or WB-AMR, etc.), number of total erasures, number of total playbacks, and/or various cellular metrics (e.g., serving cell type, radio metrics, etc.) One example of evaluating CS audio quality may use the following expressions:

Audio Quality=(Total Erasure/Total Playback)>TH1
for NB-AMR, or

Audio Quality=(Total Erasure/Total Playback)>TH2
for WB-AMBR.

As indicated in the expressions above, the obtained/determined audio quality may be checked against respective threshold values (TH1, TH2) corresponding to NB and WB communications. It should also be noted that as used herein, a higher audio quality score is indicative of lower audio quality. For example, the audio quality value exceeding a threshold value is indicative that the audio quality is considered to be below and expected audio quality, or below an audio quality that may not trigger biasing of a network policy (algorithm).

The audio quality information may be cached for future use. For example, the current audio quality may be cached until Wi-Fi link down events. Furthermore, the audio quality information may be stored in a persistent historical database to consider historical information along with current information in making a determination whether to bias a RAT selection policy algorithm or multiple RAT selection policy algorithms. In some embodiments the audio quality information may be pushed by the device (e.g. by the UE) to a centralized server or to neighboring devices, for example.

According to at least the above, both present and historical audio quality information—for example audio quality information associated with more recent phone calls and previously conducted phone calls from earlier time periods—may be used to determine whether to bias RAT selection policy algorithms. For example, scores from current and historical audio qualities may be combined to determine when to enable biasing for Wi-Fi to Cellular handover. For example, respective biasing scores may be assigned corresponding to current audio quality and historical audio quality, and a combined score may be determined as a weighted function of the current score and the historical score. The combined score may thus be expressed as:

Combined Score=function($w1$*current score+
$w2$*historical score).

If the Combined Score>TH, (greater than a specified threshold), the RAT selection policy algorithm may be biased toward favoring Wi-Fi (with respect to cellular) when making handover decisions, otherwise the algorithm may remain unbiased for use when making RAT selection decisions with the device in idle-mode and/or making handover decisions.

In addition to using the above mentioned present and historical audio quality information, a device may also leverage crowd sourced audio quality information associated with other neighboring devices, if such information is available, to determine whether or not to bias a RAT selection policy algorithm. Use of such information may be helpful in hotspot scenarios, for example, as there may be multiple devices experiencing various audio quality issues at the same specific location where the device is presently located. Therefore, any device newly arriving at the specific location may be able to benefit from pertinent audio quality information associated with other devices also located at the specific/specified location. In order to consider information associated with neighboring devices, each device (e.g. each neighboring device) may independently calculate/determine its own audio score (for example as previously discussed with respect to the historical audio quality information), and may share that information with neighboring devices, for example through a server (AWD or P2P) connection. Alternately, a server may be used to also calculate a combined score associated with a group of different devices at a given location (or a combined score associated with all the different devices at the given location), and may share the combined scores with the interested device, allowing the device to use that score in determining whether to bias an RAT selection policy algorithm or multiple RAT selection policy algorithms.

In some embodiments the combined score may be expressed by the following expression:

Combined Score=function(weight1*current audio quality score+weight2*historical audio quality score+weight3*crowd sourced audio quality score).

If the combined score exceeds a specified threshold value, it may trigger biasing the RAT selection policy algorithm(s), otherwise the unbiased algorithm may be used for determining which RAT is selected for future wireless communications.

Figure 10:
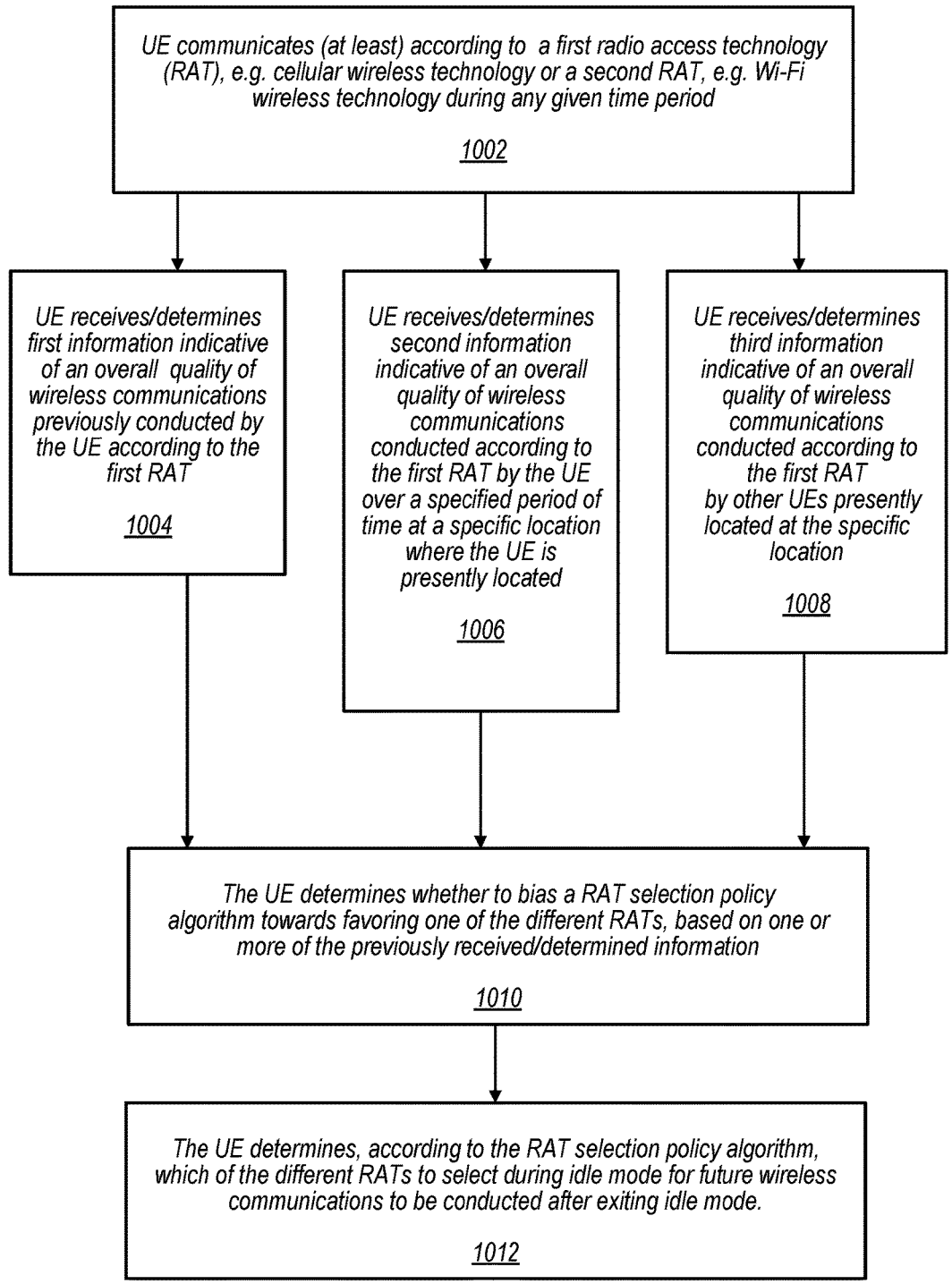
FIG. 10 shows a flowchart of an exemplary method for dynamically biasing a radio access technology selection policy algorithm, according to some embodiments.

FIG. 10—Flow Diagram of Exemplary Method for Dynamically Biasing a Radio Access Technology Selection Policy Algorithm FIG. 10 shows a flow diagram of an exemplary method for dynamically biasing a radio access technology selection policy algorithm. As shown in FIG. 10, a device, for example a wireless communication device (UE) may communicate (at least) according to a first radio access technology (RAT), e.g. cellular wireless technology or a second RAT, e.g. Wi-Fi wireless technology during any given time period, e.g. conducting voice/audio calls (1002). The device may receive/determine first information indicative of an overall quality of wireless communications previously conducted by the device according to the first RAT (1004). The device may also receive/determine second information indicative of an overall quality of wireless communications conducted according to the first RAT by the UE over a specified period of time at a specific location where the UE is presently located (1006). In addition, the device may also receive/determine third information indicative of an overall quality of wireless communications conducted according to the first RAT by other devices presently located at the specific location where the device is presently located (1008). The device may then determine whether to bias a RAT selection policy algorithm towards favoring one of the different RATs, based on one or more of the previously received/determined information (1010). The device may subsequently determine, according to the RAT selection policy algorithm, which of the different RATs to select during idle-mode (when the device is in idle-mode) for future wireless communications to be conducted after exiting idle-mode (1012).

For example, in 1010 the device may determine that the RAT selection policy algorithm should be biased, and may proceed to bias the RAT selection policy algorithm (e.g. as previously described above), and may subsequently use the biased RAT selection policy algorithm in making a decision regarding which of the different RATs to select during idle-mode for future wireless communications to be conducted after the device exits idle-mode. Thus, if the RAT selection policy algorithm was biased toward favoring Wi-Fi communications, when using the biased RAT selection policy algorithm to determine which RAT to select for future communications to be conducted by the device upon the device exiting idle-mode, the device might select Wi-Fi rather than cellular communications under conditions that would have otherwise resulted in the device selecting cellular communications when using an unbiased RAT selection policy algorithm.

As previously described, biasing the RAT selection policy algorithm to favor any given RAT and/or technology, for example to favor Wi-Fi, may include adjusting the weights, requirements and/or consideration given to any one or more of the metrics used in making decisions while executing the RAT selection policy algorithm. Therefore, in reference to FIG. 10, the first and/or second and/or third information received/determined by the UE (at 1004 and/or 1006 and/or 1008, respectively) may be used by the UE to determine whether to adjust/modify the weight/importance/requirements attributed to the metrics used in the decision making process while executing the RAT selection policy algorithm. For example, based on the received first, second, and/or third information—which may be respectively associated with first, second and third metrics—the UE may determine that the weight/importance/requirements attributed to fourth metrics, fifth metrics, sixth metrics, etc. used in the decision making while executing the RAT selection policy algorithm may be adjusted/modified to favor the second RAT.

For example, at 1010 the UE may determine that biasing the RAT selection policy algorithm is to be performed. Accordingly—with reference to FIG. 8, for example—the UE may relax and/or strengthen respective criteria associated with metrics used in the decision making at 808, thereby biasing the RAT selection policy algorithm towards favoring a specific (e.g. desired) RAT and/or technology. The UE may then use the RAT selection policy algorithm, e.g. by the UE executing the RAT selection policy algorithm, to determine which RAT to select for future wireless communications once the UE has exited idle mode. In this manner, the UE may use additional metrics/criteria to determine whether other metrics—e.g. those used in decision making while executing an RAT selection policy algorithm—may be given more or less weight during execution of a RAT selection policy algorithm to determine which RAT the UE intends to use once the UE is no longer in idle mode. It should also be noted that such adjustments may apply at any nodes or decision-making points in the RAT selection policy algorithm, insofar that those decisions are affected by such biasing. For example, with reference to FIG. 9, the decision at 912 and/or the decision at 910 may be affected. As also previously noted, the biasing may be applied to RAT selection policy algorithms associated with cellular-preferred policies, etc.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processing element configured to cause a wireless communication device (UE) to:
communicate according to any one of two different wireless radio access technologies (RATs) during any given time period; and
determine whether to bias a RAT selection policy algorithm toward favoring one of the two different wireless RATs, based on one or more of the following:
first information indicative of an overall quality of wireless communications previously conducted by the UE according to a first RAT of the two different RATs;
second information indicative of an overall quality of wireless communications conducted according to the first RAT by the UE over a specified period of time at a specific location where the UE is presently located; or
third information indicative of an overall quality of wireless communications conducted according to the first RAT by other UEs presently located at the specific location;
bias the RAT selection policy algorithm if the determination indicates that the RAT selection policy algorithm is to be biased; and
determine, according to the RAT selection policy algorithm, which of the two different wireless RATs to select during idle-mode for future wireless communications to be conducted after exiting idle-mode.

2. The apparatus of claim 1, wherein the processing element is configured to further cause the UE to determine a combined biasing score using the first information, the second information and the third information, and determine whether to bias the RAT selection policy algorithm based on the combined biasing score.

3. The apparatus of claim 2, wherein the combined biasing score comprises respectively weighted values corresponding to the first information, the second information, and the third information.

4. The apparatus of claim 2, wherein the processing element is configured to further cause the UE to bias the RAT selection policy algorithm towards favoring the second RAT if the combined biasing score exceeds a specified threshold value.

5. The apparatus of claim 1, wherein the processing element is configured to further cause the UE to determine overall quality of wireless communications according to one or more of the following:
codec type;
number of total erasures;
number of total playbacks; or
cellular metrics.

6. The apparatus of claim 1, wherein the wireless communications comprise audio calls.

7. The apparatus of claim 1, wherein the processing element is configured to further cause the UE to generate the first information while conducting wireless communications according to the first RAT, and store the first information in a persistent historical database for later use in determining whether to bias the RAT selection policy algorithm.

8. A wireless communication device (UE) comprising:
radio circuitry configured to facilitate wireless communications of the UE according to a first radio access technology (RAT) and a second RAT; and
a processing element configured to interoperate with the radio circuitry to cause the wireless communication device to:
determine whether to bias a RAT selection policy algorithm, based on one or more of the following:
first information indicative of an overall quality of wireless communications previously conducted by the UE according to a first RAT of the two different RATs;
second information indicative of an overall quality of wireless communications conducted according to the first RAT by the UE over a specified period of time at a specific location where the UE is presently located; or
third information indicative of an overall quality of wireless communications conducted according to the first RAT by other UEs presently located at the specific location;
bias the RAT selection policy algorithm if the determination indicates that the RAT selection policy algorithm is to be biased; and
determine, according to the RAT selection policy algorithm, which of the first RAT and the second RAT to select during idle-mode for future for future wireless communications to be conducted after exiting idle-mode.

9. The UE of claim 8, wherein the processing element is configured to interoperate with the radio circuitry to further cause the UE to determine a combined biasing score using the first information, the second information and the third information, and determine whether to bias the RAT selection policy algorithm based on the combined biasing score.

10. The UE of claim 9, wherein the combined biasing score comprises respectively weighted values corresponding to the first information, the second information, and the third information.

11. The UE of claim 9, wherein the processing element is configured to interoperate with the radio circuitry to further cause the UE to bias the RAT selection policy algorithm towards favoring the second RAT if the combined biasing score exceeds a specified threshold value.

12. The UE of claim 8, wherein the processing element is configured to interoperate with the radio circuitry to further cause the UE to determine overall quality of wireless communications according to one or more of the following:
codec type;
number of total erasures;

number of total playbacks; or cellular metrics.

13. The UE of claim 8, wherein the processing element is configured to interoperate with the radio circuitry to further cause the UE to generate the first information while conducting wireless communications according to the first RAT, and store the first information in a persistent historical database for later use in determining whether to bias the RAT selection policy algorithm.

14. A non-transitory memory element storing instructions executable by a processing element to cause a wireless communication device (UE) to:

conduct wireless communications according to any one of a plurality different of radio access technologies (RATs) during any given period of time;

determine whether to bias a RAT selection policy algorithm, based on one or more of the following:

first information indicative of an overall quality of wireless communications previously conducted by the UE according to a first RAT of the plurality of different RATs;

second information indicative of an overall quality of wireless communications conducted according to the first RAT by the UE over a specified period of time at a specific location where the UE is presently located; or third information indicative of an overall quality of wireless communications conducted according to the first RAT by other UEs presently located at the specific location;

bias the RAT selection policy algorithm if the determination indicates that the RAT selection policy algorithm is to be biased; and determine, according to the RAT selection policy algorithm, which of the plurality of RATs to select during idle-mode for future wireless communications to be conducted after exiting idle-mode.

15. The non-transitory memory element of claim 14, wherein the instructions are executable to further cause the UE to determine a combined biasing score using the first information, the second information and the third information, and determine whether to bias the RAT selection policy algorithm based on the combined biasing score.

16. The non-transitory memory element of claim 15, wherein the combined biasing score comprises respectively weighted values corresponding to the first information, the second information, and the third information.

17. The non-transitory memory element of claim 15, wherein the instructions are executable by the processing element to further cause the UE to bias the RAT selection policy algorithm towards favoring a second RAT of the plurality of RATs if the combined biasing score exceeds a specified threshold value.

18. The non-transitory memory element of claim 14, wherein the wireless communications comprise audio calls, and wherein the first information, the second information, and the third information comprise audio quality information.

19. The non-transitory memory element of claim 14, wherein the instructions are executable by the processing element to further cause the UE to generate the first information while conducting wireless communications according to the first RAT, and store the first information in a persistent historical database for later use in determining whether to bias the RAT selection policy algorithm.

20. The non-transitory memory element of claim 14, wherein the instructions are executable by the processing element to further cause the UE to determine overall quality of wireless communications according to one or more of the following:

codec type;

number of total erasures;

number of total playbacks; or cellular metrics.

* * * * *